Feb. 13, 1962  H. H. THUROW ETAL  3,020,696
COMBINE ATTACHMENT FOR RETRIEVING DOWN EARS OF CORN
Filed Sept. 11, 1959  2 Sheets-Sheet 1
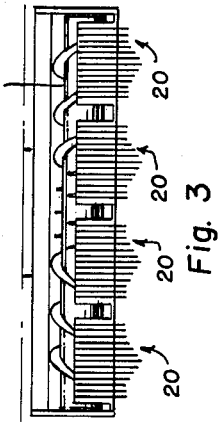
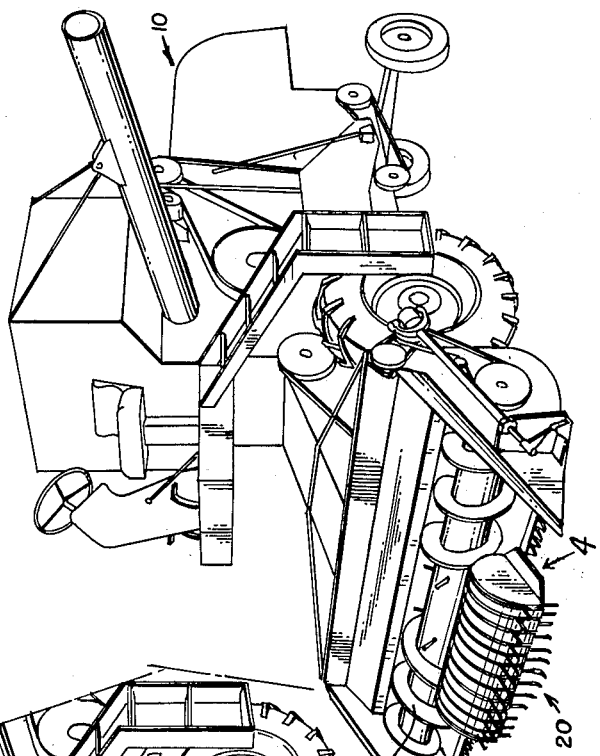
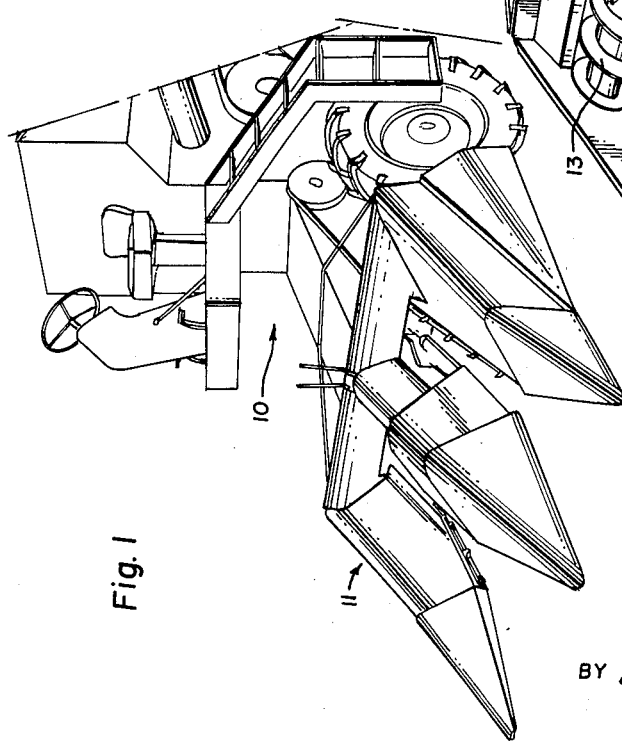
INVENTORS
Herbert J. Thurow
Harold H. Thurow
BY
ATTORNEY Feb. 13, 1962 H. H. THUROW ETAL 3,020,696
COMBINE ATTACHMENT FOR RETRIEVING DOWN EARS OF CORN
Filed Sept. 11, 1959 2 Sheets-Sheet 2

INVENTORS
Herbert J. Thurow
Harold H. Thurow
BY
ATTORNEY

United States Patent Office
3,020,696
Patented Feb. 13, 1962

3,020,696
COMBINE ATTACHMENT FOR RETRIEVING DOWN EARS OF CORN
Harold H. Thurow, Ault, Colo. (Rte. 1, Eaton, Colo.) and Herbert J. Thurow, Eaton, Colo. (Rte. 2, Ault, Colo.)
Filed Sept. 11, 1959, Ser. No. 839,437
3 Claims. (Cl. 56—364)

This invention relates to combines, of the type having interchangeable heads for use in combining grain, harvesting corn or the like agricultural crops, and more particularly is an attachment to be removably secured to the front of such a combine, in lieu of the conventional corn harvester head and the conventional grain reel head, for retrieving down ears of corn, which were broken off and lie on the ground and which were not harvested by the conventional corn harvester. Heretofore, as far as known, hand labor has had to be employed to manually walk along the corn rows and pick up the said down ears, and which down ears are in substantial quantity, and which labor cost is very expensive. Heretofore, as far as known, there has been no machine capable of being attached to a combine for the doing of such pick-up job, and which is of practical design to result in efficient operation and within the cost price range requirements of corn farmers.

It is, therefore, a principal object of our invention to provide a novel removable attachment for the front of a grain combine for retrieving down ears of corn, from a row so-called channel, upon going over the field with a combine having our attachment, along the rows.

Another object of our invention is to provide such a down ear retriever attachment with retriever fingers mounted on a rotatable wheel in combination with stripper flanges such that upon rotation of the wheel the fingers pass between a pair of stripper flanges in a novel manner, for purpose of protecting the corn ear from being crushed by the fingers.

A further object of our invention is to provide such a retriever attachment having a retriever wheel of novel design and with retriever fingers extending therefrom in a novel manner, in combination with a pair of stripper flanges of semi-circular design and on an eccentric axis to the wheel, whereby, upon rotation, said fingers will be pulled end-wise longitudinally thereof between said flanges, rather then cross-wise of the fingers with relation to the flanges.

Another object of our invention is to provide such an attachment of sturdy construction and of economical cost and yet for efficient operation.

Other objects will be apparent to those skilled in the art, upon reference to the following detailed description and to the drawings, in which drawings:

FIGURE 1 is a diagrammatical partial perspective view of a conventional combine machine, having a conventional two row removable corn picker attachment secured to the front thereof in lieu of the conventional grain reel;

FIGURE 2 is a perspective view of such a combine machine, but with the corn picker harvester head 11 removed therefrom, and in its stead having our novel removable down ear retriever attachment 20 secured thereto;

FIGURE 3 is a partial diagrammatical front view illustrative of how we place four of our attachments 20, side by side, at the front of a modern grain combine, just ahead of the augur 13 and cutter bar 12 thereof, for retrieving the down ears from four rows at a time.

Figure 4:
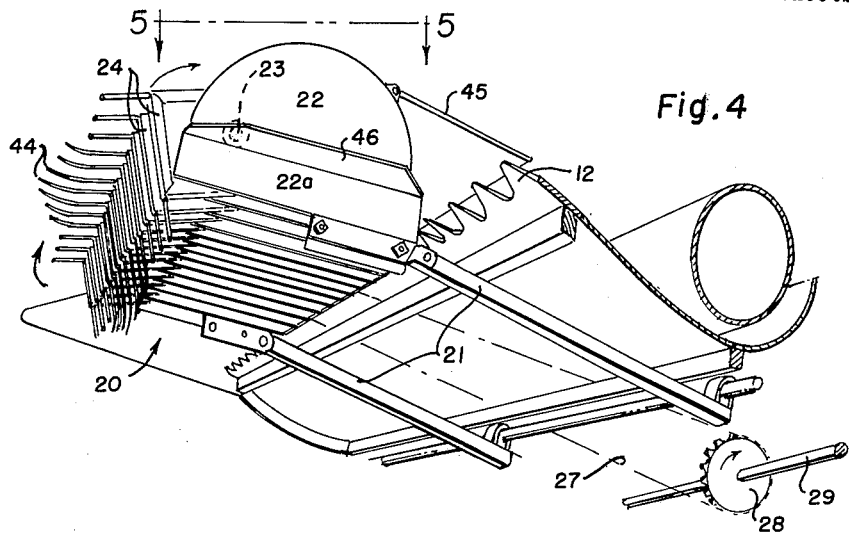
Figure 5:
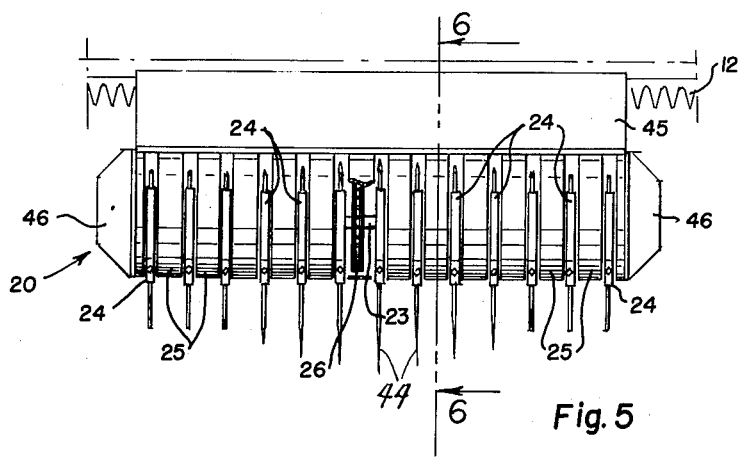
Figure 6:
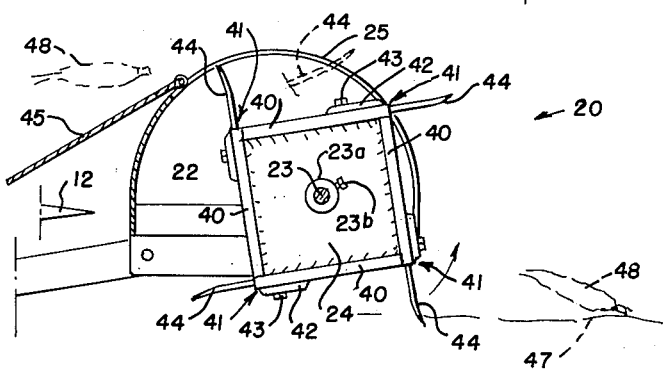

FIGURE 4 is a partial underside elevational view of our attachment unit 20, looking in the direction of the arrow 4 of FIGURE 2, showing how we attach our unit to the front of the combine;

FIGURE 5 is a top plan view of our retriever attachment in place on the front of a combine, as viewed looking in the direction of the arrows 5 of FIGURE 4; and FIGURE 6 is a cross-sectional view of our retriever attachment, taken on the line 6—6 of FIGURE 5.

We will explain the use of our attachment to pick up down corn ears left lying on the ground.

While we illustrate only one of our retriever attachment units 20 in FIGURE 2, we actually use four of such units at the head of the modern large conventional combine, capable of retrieving down ears of corn from four corn rows at a time, as diagrammatically illustrated in FIGURE 3. Each of our attachment units 20 is of a width substantially equal to the width of a row of corn. It will be understood that, before our attachment is used, a field of corn has been so-called harvested, by being gone over with a conventional corn harvester, such as with a combine having a snapper head as illustrated in FIGURE 1, after which the corn stalks are substantially reduced in size, with no corn ears left on whatever portion of the stalks are left standing, and with a quantity of down ears of corn left lying on the ground. Usually the ground between a row of such corn stalks is channel shaped, with the resultant down ears lying down in such channel. We remove the conventional corn harvester head 11, from the combine 10, and we substitute therefor, by removably mounting, four of our novel retriever attachments 20 at that front end of the combine, for reasons explained, and then the field is gleaned of its down ears by travelling the machine along the cut or harvested corn rows to pick up the down ears by our attachments. Our attachment, upon operation of the machine, lifts the down ears from the ground and dumps them onto flap 45 and into the machine centering augur 13, as will be explained.

Referring to the drawings in detail, the numeral 10 represents a conventional modern grain combine, and 11 represents the conventional corn snap-picker or harvester head attachment, removably placed and operated by the combine at the front thereof in lieu of the usual grain reel.

Our novel retriever attachment 20 comprises a unit, having suitable underframing including rigid arms 21, an aligned pair of identical semi-circular end shields 22 secured suitably thereto, a rotatable shaft 23 positioned between and suitably journalled at and carried by the ends 22, equally spaced apart retriever wheels 24 each transversely of and rigidly suitably fixed to said shaft, and with semi-circular flange guards 25 of the same semi-circular shaped curve as the ends 22 and aligned therewith and spaced between each retriever wheel 24 to permit rotation of each wheel therebetween a pair thereof, with the projected axis of the guards 25 and the axis of the shaft 23 being in eccentric relation, all as illustrated. Stripper flanges, 25, in effect, substantially enclose the upper portion of our unit, 20, except for the space between a pair thereof in which a retriever wheel 24 operates. We mount a driven chain sprocket wheel, 26, as illustrated, securely to shaft 23 by suitable means near the center of the shaft and between a pair of our wheels 24. We secure our unit 20 to the front of the combine by removably rigidly bolting arms 21 of the frame-work of the unit to the underside of the front platform framework of the combine, just forwardly of the combine machine's cutter bar 12, as illustrated in FIGURE 4, so that each of our units 20 is carried by its arms 21, and they in turn by the combine 10. The combine 10 has a drive power take-off shaft 29, illustrated in FIGURE 4, and we securely mount a chain sprocket 28 drive pulley wheel thereto, and have a suitable chain pulley 27 over sprocket wheels 26 and 27 for causing rotation of the shaft 23 clockwise as illustrated in FIGURE 4. Our rotatable shaft 23 is suitably journalled by bearings carried by each of the ends 22, in effect longitudinally of our semi-circular in effect barrel unit 20, as explained, with each of the bearing points in alignment with each other at the said ends 22, and which common bearing alignment points is eccentric to the true radius center point of each of said ends 22, for reason to be explained, as shown in FIGURE 6.

We form each of our retriever wheels 24 of square peripheral shape, with a suitable center opening-hub collar 23a having a conventional lock-stud-screw bolt 23b for securing the wheel to the shaft 23 so as to rotate therewith. Each of our spaced apart retriever wheels 24, on rotatable shaft 23, are identical, except for the fingers thereof certain ones at the end of the shaft, each wheel being square and with said collar around a hub-opening in its center. It will be seen that each of the square peripheral sides, of each wheel 24, is at a right angle to a radius of its wheel, for reason to be explained. We suitably mount, as by welding, a tube 40, of the same length as an edge of that wheel, to each of those square edges of each wheel 24, in relation to each other, as illustrated, whereby each tube overlaps an end of another tube and so that there is one exposed or open end 41 of each tube. To the outer edge of each tube 40, adjacent its open end 41, we suitably secure, as by welding, a short key-seat-bar 42, and through each portion 42 and its tube 40 outer edge we form an internally screw-threaded opening in which we conventionally place a screw-stud lock-bolt 43. We provide finger retriever rods 44, of slightly smaller outer size to the inside size of the tubes 40, and slidably place them within each tube 40 open end 41, and each finger 44 is adjustably held within its tube 40 by a seating of its lock-bolt 43 and comprises a part of each wheel 24. Each finger 44 is locked in its tube 40 to protrude therefrom a pre-determined distance from its respective wheel periphery, according to the position of the wheel on the shaft 23 with relation to the entire unit 20, so that the fingers are set to protrude the longest at the center of our unit 20 and to protrude the shorter at the edges of our unit, as illustrated and for reason to be explained. We design the outer ends of each finger 44 at the center of our unit of a slightly crescent shape leading end, as illustrated. In the operation of the combine, with our attachment 20 in place, it will be seen that the lower segment of each of our retriever wheels 24 moves in the direction of travel of the combine. Each of our shorter stub fingers 44, at the outer ends of the unit, upon operation of a combine having our attachment at the front thereof, act to kick the down ears of corn ahead along the channel-shaped ground between rows of corn stalks, and, because of that concavity contour of such ground, the ears will roll downwardly toward the center of channel and where our hooked ends of our center fingers 44 will then easily pick-up those ears better than could be done near the edges of the channel row, as will be explained.

Stripper flanges 25, secured to the lower frame-work of our unit 20 in suitable manner, as explained, are positioned between each retriever wheel 24 so as to permit free rotation of each of those wheels between a pair thereof, and yet the adjacent inner edge of each flange 25 is in close proximity with an edge of a wheel 24, for reason to be explained. Each wheel 24 and its fingers 44 are of a common thickness. As the wheels 24 are rotated by the shaft 23, counter-clockwise as illustrated in FIGURE 6 and clockwise as illustrated in FIGURE 4, it will be noted that the fingers 44, of each wheel 24, are pulled end-wise under the plane of a pair of adjacent stripper flanges 25 as those fingers pass beyond the top center of the unit, for reason to be explained. We provide a hinged solid guard-flap 45 at the rear of each unit 20 framework, positioned and suitably hingedly mounted as illustrated in FIGURES 4 and 6, of a size to extend over the cutter bar 12 of the combine, to protect ears of corn falling thereon from said cutter bar and also to guide the ears into the centering augur 13 of the combine. We also provide hinged end-flaps 46, at the outer ends of each unit 20, which overlap together when we use four of our attachments side by side as illustrated diagrammatically in FIGURE 3, to act as a floor to catch any ears as might fall thereon.

In the operation of a combine having our attachment, it will thus be seen that, as the combine moves along previously harvested stub rows of corn stalks, that power from combine shaft 29, through 27—28—26—23, rotates wheels 24, and with each its retriver fingers 44, in direction of the lower segmental portion of each wheel toward the direction of travel of the machine, as indicated by the arrow of FIGURE 6, and that, on said operational rotation, each of the center ones of fingers 44 will act to retrieve by lifting down ears of corn 48 off the ground 47. That retrieving is done by said center group of fingers lifting said down ears up from the row channel onto the outside of the semi-circular or barrel-affect frame-work formed by the stripper-flanges 25, where continued rotational movement of those fingers, and also of the outer fingers, pushes the ears of corn beyond the top center of unit 20, as illustrated in FIGURE 6, when and where the ears will fall down onto flange 45 and clear of cutter bar 12 and into the centering augur 13. Though not a part of this invention, it will be understood that the conventional combine centering augur directs the ears into position where a conveyor takes them back to the sheller portion of the combine, and then separates the shelled corn from the cobs and delivers the shelled corn to a bin of the combine. We have indicated the center of such a ground channel between rows by the numeral 47, as the machine is operated forwardly or to the right as viewed in FIGURE 6.

We have a distinct novel construction of a retriever wheel 24, and its retriever finger 44 placement thereon, in eccentric combination with our stripper flanges 25. By our method of attaching the fingers 44 to the periphery of a wheel 24, with each finger extending at a right angle to an adjacent radius of its wheel 24, and with the shaft 23 axis of each wheel being in an eccentric offset position with relation to the true center of the arc of the semi-circular stripper-flanges 25, it will be seen, that, upon rotation of the wheels 24, that the fingers 44 will each be drawn between a pair of aligned stripper flanges 25 in a novel trailing stripping movement, namely, as shown in dotted lines of a finger 44 in FIGURE 6, each finger is pulled substantially longitudinally thereof or end-wise through the slot or space between a pair of aligned stripper flanges 25. The result just mentioned is of distinct novel advantage in the retrieving of a down ear of corn thereby without damaging it. Our novel trailing finger movement, just explained, is substantially by an end-wise movement of our fingers, rather than a broadside movement thereof, upon wheel 24 rotation, with relation to the stripper flanges 25, and that movement is due to our novel method of securing the broadside of the fingers directly to the periphery of the wheel. It is to be noted that we place our fingers 44 on the wheel 24 in spaced radial relationship, of the longitudinal axis of the fingers, from the wheel axis, or in a non-true radius position of the fingers with relation to that wheel, as shown. It is late in the fall or early winter by the time a combine with our attachment is used, and the corn has been on the ground for many weeks after normal harvest period, with the result that the kernels of the ear have dried out considerably and are comparatively loose on the cob. By our novel finger placement and movement with relation to the stripper flanges, on use the fingers will not pinch the ear of corn against the outer surface of the stripper flanges 25, which would occur were those fingers to move at that upper drum point in broadside or cross-wise of the fingers relationship to the upper outer surface of the stripper-flanges. That end-wise movement of each finger 44 is accentuated and made possible because of our novel positioning of each finger in effect as a tangent directly onto the outer peripheral edge of a wheel 24 and at a right angle to the adjacent radius of that wheel, as illustrated in FIGURE 6.

It will be obvious that many changes, alterations and modifications may be made in the embodiment of our invention hereby illustrated and described without deviating from the teaching and spirit thereof, and therefore we wish to be bound only by the hereunto appended claims.

What we claim and desire to secure by Letters Patent is:

1. In combination, in a down ear corn retriever unit attachment for combines having a cutter bar and a power take-off shaft and drive pulley wheel, a frame including arms adapted to be secured to the front of the combine ahead of the cutter bar and adapted for carrying the unit thereby, identical semi-circular aligned end housing members connected to and carried by said arms, means for connecting the end members to the arms, a rotatable shaft extending between said end members and rotatably carried thereby and having a driven pulley wheel secured rigidly thereon, identical journal means on each end member for so rotatably carrying said shaft thereby, said shaft being so carried by each end member at identical points thereon and which are eccentric to the diametrical center point of the semi-circular end members, means for securing the driven wheel to the shaft, a plurality of spaced apart identical retriever wheels each rigidly secured transversely of and to said shaft, identical hub means for securing each wheel to the shaft, each wheel having adjustably extending retriever finger rods secured to the peripheral edge thereof and with each finger extending from the peripheral edge in a plane at a right angle to a radius of the wheel to which secured, identical means on a wheel periphery for so adjustably securing each finger rod thereto, identical stripper finger flanges with one thereof secured to the frame between each pair of wheels and extending in the same semi-circular shape as and in the plane of the aligned end members and each thereof in close proximity to the sides of an adjacent pair of wheels and to permit each of said wheels to rotate freely without contact therewith, identical means for securing each stripper flange to the frame in such position, and a pulley belt means extending over and between the drive pulley wheel and the driven pulley wheel of the rotatable shaft.

2. A down ear corn retriever unit attachment for combines as defined in the preceding claim 1, and characterized further by the definition of the combine power drive shaft pulley wheel and pulley operating in a direction to cause the driven pulley wheel of the shaft to rotate in a direction to cause the retriever wheels to rotate with their lower segments moving in the direction of travel of the combine to which the unit is attached, the semi-circular end members and the same semi-circular aligned therewith stripper-flanges extending upwardly of the unit from its frame, and the eccentric positioning of the shaft extending between the end members and with relation thereto being such that the axis of said shaft is at a point closer to the part of the retriever unit farthest from the combine to which the unit is attached.

3. A retriever attachment for combines, said attachment comprising a frame for attachment to a combine, a pair of spaced semi-circular aligned end housing members mounted on said frame, a shaft rotatably mounted on said housing members eccentrically with respect to the arcuate edges of said members, a plurality of spaced polygonal wheels fixed to said shaft between said members, each wheel having a plurality of flat peripheral edge surfaces, retriever fingers adjustably secured to at least certain of said edge surfaces and projecting outwardly in the plane thereof in a symmetrical arrangement, semi-circular stripper flanges mounted on said frame between said end members in eccentric relation with respect to said wheels, there being one flange disposed between each pair of wheels, and means to drive said shaft from the combine.

References Cited in the file of this patent
UNITED STATES PATENTS

| | | |
|---|---|---|
| 1,116,885 | Hannan | Nov. 10, 1914 |
| 2,362,402 | Reiter | Nov. 7, 1944 |
| 2,527,887 | Martin | Oct. 31, 1950 |
| 2,661,585 | Hansen | Dec. 8, 1953 |
| 2,796,722 | Hanford et al. | June 25, 1957 |
| 2,841,943 | Dumanowski | July 8, 1958 |